(12) United States Patent
Ursu

(10) Patent No.: US 6,359,238 B1
(45) Date of Patent: Mar. 19, 2002

(54) APPARATUS AND METHOD FOR WEIGHING A MOVING OBJECT

(75) Inventor: Valerian Ursu, Farmington, MI (US)

(73) Assignee: Siemens ElectroCom, L.P., Arlington, TX (US)

( * ) Notice: Subject to any disclaimer, the term of this patent is extended or adjusted under 35 U.S.C. 154(b) by 0 days.

(21) Appl. No.: 09/466,289

(22) Filed: Dec. 17, 1999

(51) Int. Cl.[7] ............................ G01G 9/00; G01G 13/02
(52) U.S. Cl. ............................................ 177/1; 177/119
(58) Field of Search ................................. 177/119, 121, 177/145, 132, 133, 1

(56) References Cited

U.S. PATENT DOCUMENTS

| | | | | |
|---|---|---|---|---|
| 5,111,897 A | * | 5/1992 | Snyder et al. | 177/132 |
| 5,300,736 A | * | 4/1994 | Ehrhardt | 177/145 |
| 5,585,604 A | * | 12/1996 | Holm | 177/133 |
| 5,635,679 A | * | 6/1997 | Kohashi et al. | 177/145 |
| 5,773,766 A | * | 6/1998 | Kinoshita et al. | 177/132 |
| 5,990,422 A | * | 11/1999 | Komori et al. | 177/145 |
| 5,998,741 A | * | 12/1999 | Bershears et al. | 177/133 |

\* cited by examiner

Primary Examiner—Randy W. Gibson
(74) Attorney, Agent, or Firm—Edward Jorgenson; Philip G. Meyers Intellectual Property Law, P.C.

(57) ABSTRACT

An apparatus and method for measuring the weight of a moving object is disclosed. In one embodiment, the apparatus includes a platform for supporting the moving object to be weighed, means for permitting the object to move smoothly over the platform, a weight sensor for measuring a force applied to the platform by the moving object and generating a weight sample that reflects the measured force value, a detection sensor that generates a signal upon detecting the moving object on the platform, a processor having a memory, which processor receives samples from the weight sensor and stores weight values based on the samples; and means for calculating the weight of the object using a succession of the stored values when the detection sensor generates its signal. In one embodiment, the means for permitting the object to move smoothly over the platform comprises a set of rollers provided on the platform, in another embodiment, the means for permitting the object to move smoothly over the platform comprises wheels on the object. In one embodiment, the method of weighing the moving object, includes the steps of: (a) moving the object to be weighed over a weighing platform; (b) sampling the value of a weight sensor which senses a load applied to the platform by the object as the object moves over the platform, the sampling being at a rate sufficient to ensure a succession of samples taken during a period of time when the object is supported by the platform; (c) storing each of the succession of samples in a buffer; (d) receiving a signal from a sensor indicating that the moving object has reached the end of the platform and in this way sufficient samples have been stored; and (e) calculating the weight of the object based on the succession of samples.

17 Claims, 3 Drawing Sheets

APPARATUS AND METHOD FOR WEIGHING A MOVING OBJECT

TECHNICAL FIELD OF THE INVENTION

The invention relates, in general, to a method and apparatus for weighing objects and, in particular, to a system for determining the weight of each object in a succession of moving objects.

BACKGROUND OF THE INVENTION

The present invention relates to a method for automatically weighing moving objects that either are self-propelled (such as a driven automobile or carriage) or moved by a conveyor system. In the past, systems for weighing moving objects used two trigger signals to control the weighing process. One trigger signal was used to start the weighing process, and the other trigger signal was used to complete the weighing process. The measurements made during the period of time between the two signals could then be processed in different ways to, for example, obtain an average weight or determine the stability of conditions within the system. Other known systems use only one trigger signal to cause a single measurement to be made, providing an instantaneous value of a weight or force for determining the stability of conditions.

This invention further concerns a weighing algorithm used in automatic weighing devices with data registration for a moving object. Most electronic scale algorithms for calculating weight provide statistical approximations of actual weight 25 signals. The latest digital signal is compared with a predetermined range, and if within the range, the last digital weight signal will be added to the statistical approximation. A zero storage register stores the zero weight. See generally U.S. Pat. No. 4,241,407. Some electronic weight measuring devices use two memory buffers and a data weight generator. The first memory buffer is used for data processing. The second buffer is used for storing and processing zero point data. See, for example, U.S. Pat. No. 4,774,683.

Another method automatically zero balances an electronic scale. If an average of input signals show that zero is within predetermined limits, the system displays "Scale Ready"; if not, it displays blank. Zero is calculated by dividing the sum of the readings by the number of readings; see U.S. Pat. No. 4,751,661.

As noted above, dynamic weighing algorithms use two trigger signals to control the start and the stop of the weighing process. The measurements between start and stop are then processed in different ways (average calculation, stability conditions, etc.) Some algorithms use just one signal to load an instant measured value or to check stability conditions. All of these algorithms also control the flow of material on the scale. This means that logic will be added to software to regulate the flow of objects to be weighed on the line, and this logic can create interfacing problems and reduce the throughput. Therefore, a need remains for a method and apparatus which simplifies the interface circuitry required for operating a system for weighing moving objects using a series of measurements without the need to slow or stop the object for weighing purposes.

SUMMARY OF THE INVENTION

The present invention provides an improved apparatus for weighing moving objects and in particular an improved system for automatically weighing moving objects that either are being self-propelled or being moved by a conveyor system. According to one aspect of the invention, an apparatus for measuring the weight of a moving object includes a scale platform for supporting the moving object to be weighed, one or more force sensors for determining the force applied to the scale platform by the moving object, a numeric computing device which continuously samples and stores the values determined by the force sensors, and only one sensor for activating a signal used to trigger the numeric computing device. The sampling rate by which the numeric computing device samples and stores force sensors is sufficient to ensure a succession of samples during the time the object to be weighed has been supported by the scale platform. The sensor for activating the trigger signal detects the leading edge of the moving object and activates the trigger signal which causes the numeric computing device to calculate the weight of the moving object based on the stored succession of samples (last "M" samples).

The invention also provides a method of weighing a moving object in which the object to be weighed either is moved or moves across a weighing platform as a weight sensor continuously senses the load or force applied to the scale. The output of the weight sensor is sampled at a rate sufficient to ensure that a succession of samples is taken during the period in which the object is on the platform. The sampled values are stored in a memory unit or buffer.

A sensor signals when the moving object has reached the end of the scale conveyor (assuring that the moving object has been supported by the scale for a period of time sufficient to ensure that the succession of samples has been stored) at which time the weight of the object is calculated based upon the succession of stored sample values. In one embodiment, the sampling and storing steps are repeated continuously and the samples are stored in a buffer on a first-in, first-out basis, enabling calculation of the weight of the object based upon a recorded series of "M" samples measured just prior to the object moving into the detection path of sensor.

In one embodiment, the weighing process is controlled so that the number of samples is determined by the relationship: $M=(Ls-Lo)/(Vo*Tcy)$; where Ls is the length of the platform in the direction of travel of the object, Lo is the maximum length of objects to be weighed, Vo is the maximum velocity at which objects move over the platform, and Tcy is a period of time between samples. Preferably M is at least as great as a predetermined number of samples used by the processor to calculate the weight of the object. It is also preferable that the objects move or are moved across the weighing platform or scale at a substantially uniform speed and that the spacing between objects is controlled to ensure that one object at a time is weighed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and are not to delimit the scope of the invention.

Figure 1:
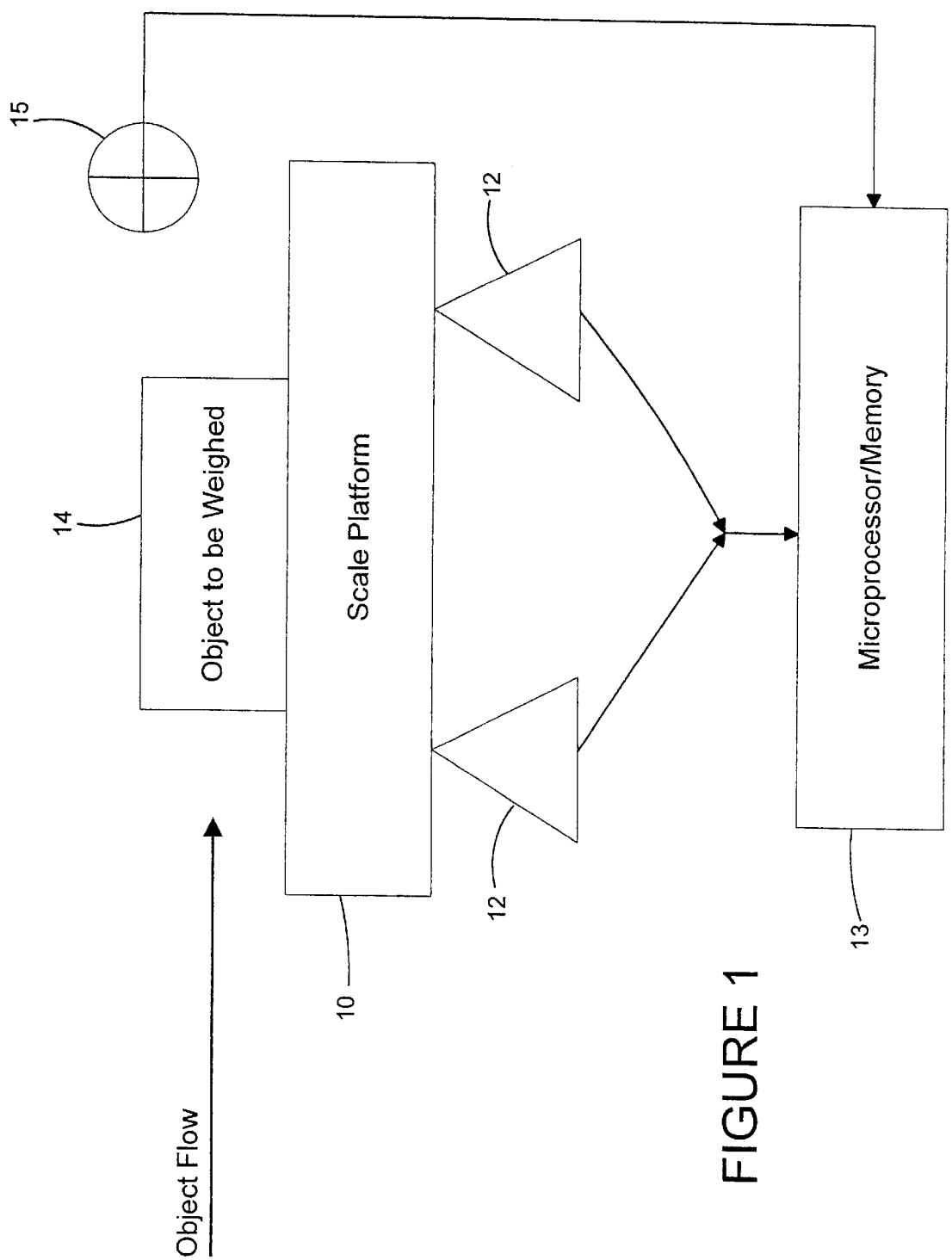
FIG. 1 is a schematic diagram illustrating one embodiment of the invention.

Referring now to the drawings, wherein like reference numerals designate like or corresponding parts throughout the several views, and in particular to FIG. 1, there is illustrated an apparatus of the invention for measuring the weight of a moving object 14. A scale platform 10 is placed upon a plurality of force sensors 12 so that a force imparted to platform 10 is reflected in the output of the sensors 12. Sensors 12 are preferably spaced apart as shown so that the force vectors applied by moving object 14 will vary as object 14 moves from one end of platform 10 to the other as illustrated. The number of sensors 12 may be one or more as desired (based on practical application). A numeric processor 13 such as a programmable logic controller (PLC) repeatedly samples the output of sensors 12 at a static rate determined upon the actual or expected velocity and length of the object to be weighed 14, determined as described below, and stores those samples in its memory. Where several sensors 12 jointly support platform 10, the values are added together by processor 13 each time a sample is taken. An edge sensor 15 is positioned at the downstream end of platform 10 relative to the approaching object 14. When the leading edge of object 14 activates sensor 15, processor 13 calculates the force imparted on platform 10 by object 14 based upon a predetermined number ("M") of the last samples previously stored in the memory of processor 13.

The invention can accommodate the weighing of a variety of objects. The size of the components of the invention may be scaled to facilitate the weighing of objects expected in a given application. Object 14 may be either moving of its own accord (e.g. on wheels, whether or not object 14 is self-propelled) or it may be moved along by a conveyor system commonly found in the art, such as a roller conveyor. Other means for smoothly moving objects over or across platform 10 are also contemplated, for example the surface of platform 10 may be a low friction surface allowing objects to slide across the platform due to the momentum of the traveling objects. A belt conveyor may also be advantageously utilized.

Figure 2:
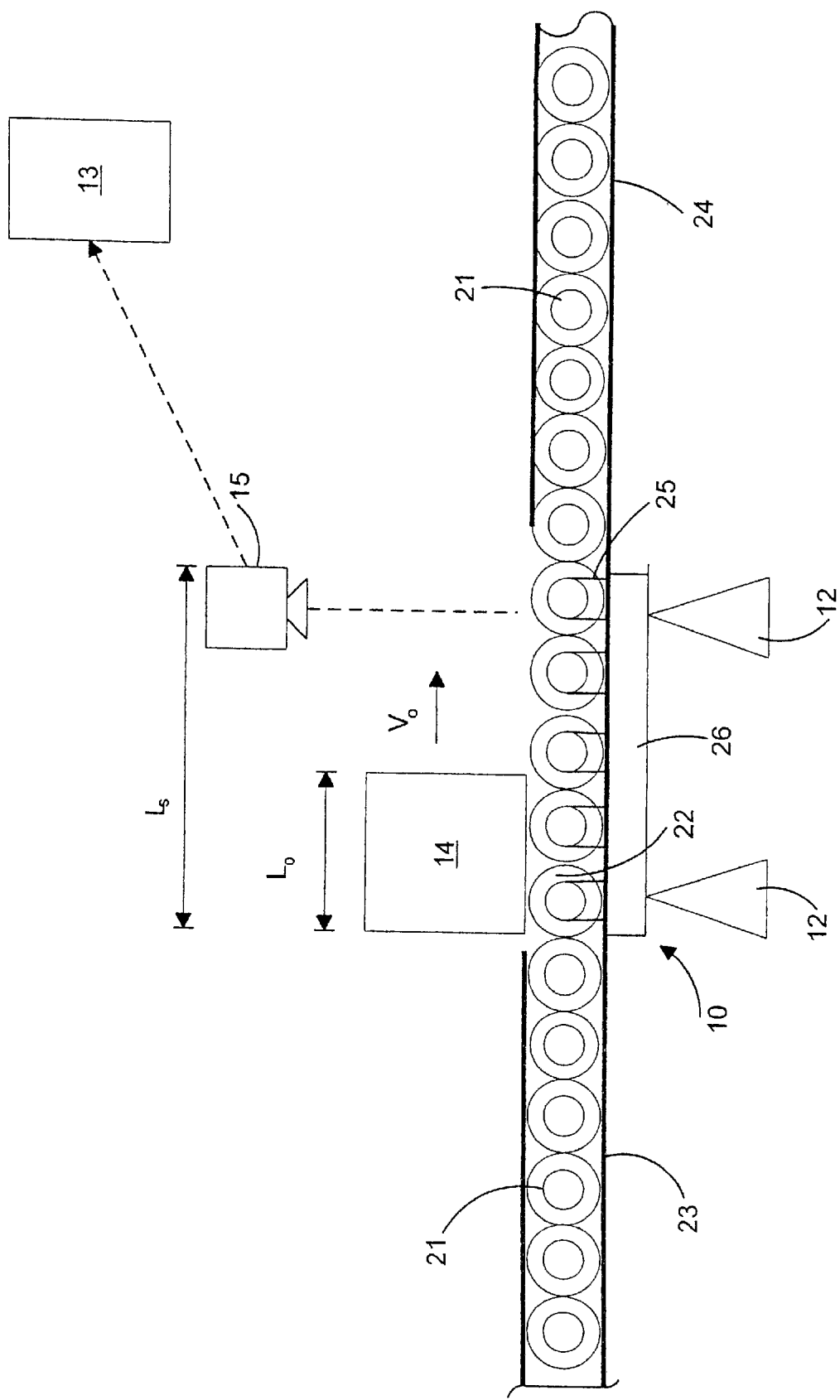
FIG. 2 is a schematic diagram of a conveyor utilizing the system of the invention.

Object 14 is most typically a non-self propelled parcel, bundle or package. As shown in FIG. 2, if object 14 is moving along a roller conveyor 23 wherein groups of rollers 21 are driven by a belt drive or power roller in a manner well known in the art, platform 10 may include a set of parallel rollers 22 that receive object 14 from the upstream powered roller section 23 and pass object 14 on to a downstream powered roller section 24. In this arrangement, rollers may be mounted as by end brackets 25 on a common plate 26 which is in turn supported on the force sensors 12 as shown.

Alternatively, all conveyors (sections 23 and 24) may be replaced by belt conveyors. In either case, the stream of objects moved onto the platform is preferably singulated with a spacing between objects in the stream sufficient to permit accurate measurements, i.e., one object at a time on the platform (when the object 14 is reaching the edge detector 15). This may be accomplished with an upstream singulation device or apparatus, a variety of which are known in the art. There should be only one object 14 on platform 10 at the moment when the object 14 being weighed encounters sensor 15. Sensor 15 may be a simple photocell as well known in the art and may be mounted either overhead, underneath or to the side(s) of platform 10.

Force sensors 12, for example load cells, are commonly known in the art and are more fully described in U.S. Pat. No. 4,241,407 by Sookikian et al. which is hereby incorporated by reference for all purposes. In one embodiment, sensor 12 according to a force applied thereon varies the electrical resistance it presents as a continuous, linear function of the applied force. The varying resistance may be used to convert to a voltage according to the relationship E=IR and applied to an analog to digital converter, from which processor 13 obtains and stores digits that represent the force applied to sensor 12. The analog to digital converter may be physically associated with sensor 12, in which case the data may be transmitted digitally to processor 13 so as to provide more immunity to electromagnetic interference, or the analog to digital converter may be associated with processor 13 as a matter of convenience.

The problems of calibration and "drift" of force sensors are well known and are addressed by Sookikian et al. cited above and Masuyama U.S. Pat. No. 4,774,683, which is hereby incorporated by reference for all purposes. A method of automatically zeroing a scale has been described in Amacher et al. U.S. Pat. No. 4,751,661 and is hereby incorporated by reference herein for all purposes. The methods of these patents may be used to operate and control sensors 12.

For the apparatus described, a time sequenced zeroing procedure was chosen. After the edge detector sensor was cleared, the processor waits for a time T1 then records the value from the scale in a temporary buffer. After recording, the processor waits for a time T2(checking if a tray was moving on the scale conveyor but was not detected yet by the sensor). If no tray is detected after the time T2, the processor will consider that the scale was empty and will transfer the value from the temporary buffer to the zero buffer. This value will be used as a zero value for future calculation. This procedure is repeated continuously (when scale is empty) compensating zero drifts.

Referring again to FIG. 2, in one embodiment the sample rate is determined from the active length Ls of scale 10, the maximum length Lo of any object 14, and the velocity Vo of object 14 as it traverses the scale, all measured along the direction of linear travel of object 14. With the maximum velocity of travel and the maximum length of object 14 being predetermined as design constraints for a particular application of the invention, the distance in which the object is known to be fully supported the active length of scale 10 is the difference between the active length of scale 10 (Ls) and the maximum length of object 14 (Lo), with said difference being divided by the maximum velocity (Vo) of object 14 to obtain the length of time (T) in which object 14 is expected to be fully supported by scale 10: T=(Ls−Lo)/Vo. The number (M) of samples to be taken during time T is a design choice based upon the number of samples which would be desired for the chosen algorithm in manipulating the data samples. Time T divided by the number of samples M yields the cycle time (Tcy), which is the period of time between samples and the reciprocal of the sampling rate: T/M=Tcy. These equations may be unified according to the formula M=T/Tcy=(Ls−Lo)/(Vo*Tcy). When the leading edge of object 14 encounters edge sensor 15, the change in sensor 15 acts to notify processor 13 to process the data samples from sensor 12. As will be appreciated Ls, Lo, Vo and Tcy may be controlled by equipment selection and operational parameters such that a number of samples M determined by the above equation is at least as great as a predetermined number of samples used by the processor 13 to calculate the weight of each object.

The memory used by processor 13 must have sufficient storage to encompass the required number of samples M and will typically contain extra storage to allow for software updates. Although in one embodiment the memory is of FIFO (First In, First Out) architecture, and at a minimum always retains the last M samples taken, it will be apparent to those skilled in the art that other memory architectures such as RAM may be utilized to implement the same function.

Figure 3:
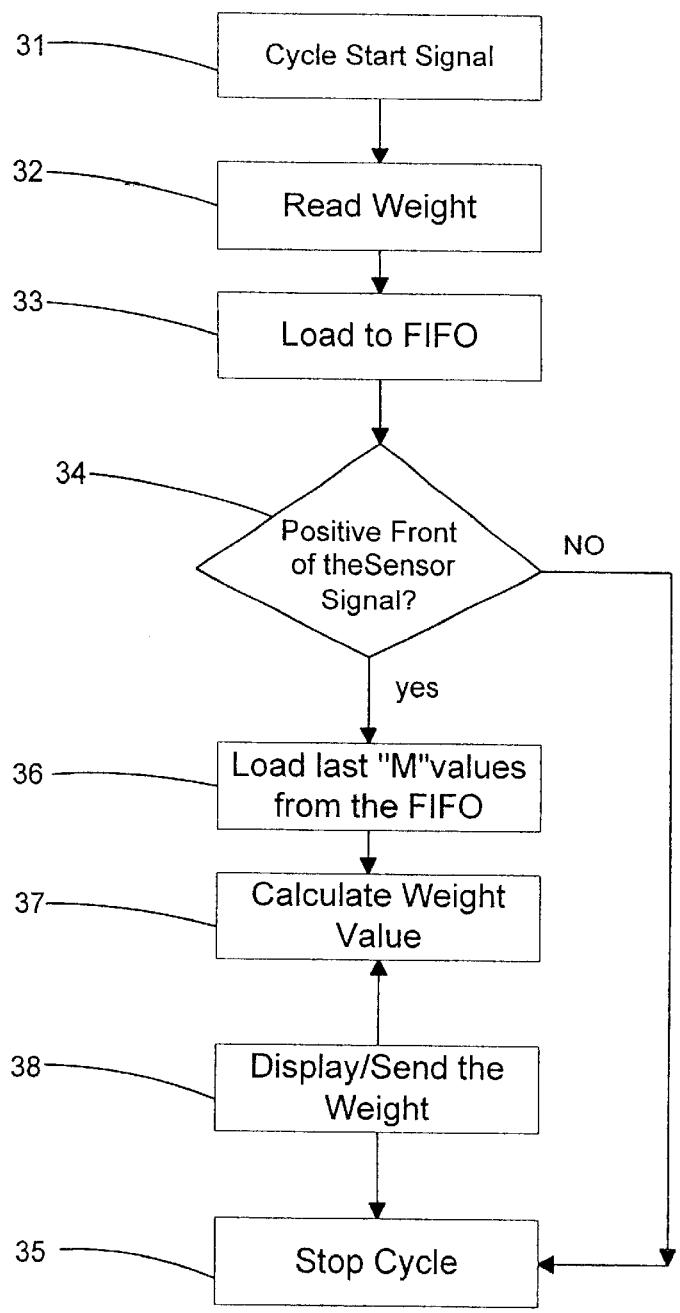
FIG. 3 is a flow chart, illustrating the steps utilized in the practice of one embodiment of the invention.

The algorithm by which processor 13 samples sensors 12 is illustrated in FIG. 3. The measuring subroutine undergoes an initiation step 31 upon the transition of the cycle start signal to an active state. The cycle start signal may be generated by a programmable counter or through software timing loops. After being initiated by the cycle start signal, processor 13 samples the sensors 12 in a read weight step 32 in order to determine the force exerted upon each of the sensors 12. Each of these samples are stored individually in memory during a load step 33. If a transition from inactive to active is not detected from edge sensor 15 trigger signal, that is, a "positive front" is not detected in decision 34, then processor 15 proceeds to stop cycle step 35 and will then wait for the next activation of the cycle start signal. If a transition from inactive to active is detected from edge sensor 15 trigger signal, processor 13 will then retrieve the last M samples taken from its memory (step 36) in order to, for example, calculate a simple numerical average by summing the samples and dividing by M in a calculation step 37. The calculated result may then be displayed to an operator, logged for further use, or sent to another unit in the conveyor system in a step 38. At this point, processor 15 proceeds to stop cycle step 35 and will then wait for the next activation of the cycle start signal. More advanced methods, such as calculating the mean of a Gaussian distribution of the samples, may alternatively be used to calculate the weight of object 14.

While certain embodiments of the invention have been illustrated for the purposes of this disclosure, numerous changes in the method and apparatus of the invention presented herein may be made by those skilled in the art. For example, edge sensor 15 may be placed near the upstream end of platform 10 and operates to determine when object 14 starts and finishes passing by sensor 15 and the length of time required in which to pass. Processor 13 samples weight sensors 12 after the second edge detection at a rate sufficient to produce a plurality of samples during the time in which it would be expected for object 14 to pass. Instead of rollers 22, platform 10 could have an extremely slick upper surface so that objects could slide across it with minimal speed loss. These and other changes are embodied within the scope and spirit of the present invention as defined in the appended claims.

What is claimed is:

1. A method of weighing a moving object, wherein the method comprises the steps of:
    (a) sampling the output of at least one sensor, the sensor sensing the force applied to a scale, the sampling being at a rate sufficient to ensure a succession of samples taken during a period of time when the object is supported by the platform;
    (b) storing the sample outputs in a buffer;
    (c) receiving a signal from an object detection sensor indicating the presence of an object on the platform;
    (d) calculating the weight of the object with a microprocessor based upon a predetermined number of the last samples stored in the buffer; and
    wherein the calculation process for an object is accomplished using values collected before the object detection sensor signals the presence of an object on the platform in step (d) and wherein a single signal is sent to the microprocessor for each object detected on the platform.

2. The method of claim 1, wherein a plurality of weight sensors sense a load applied to the platform as the object moves over the platform, the method further comprising combining the samples taken by each weight sensor at the same time to generate the succession of samples.

3. The method of claim 1, wherein the sampling and storing steps are repeated continuously and the succession of samples is stored in the buffer on a first-in, first-out basis, so that the weight of the object is calculated based on a succession of samples measured immediately prior to the arrival of a leading edge of the object in a detection path of the object detection sensor.

4. The method of claim 3, further comprising:
    repeating steps (a) to (d) for a series of objects to be weighed;
    controlling Ls, Lo, Vo and Tcy such that a number of samples M determined by the equation:

$$M=(Ls-Lo)/(Vo*Tcy)$$

wherein Ls is the length of the platform in the direction of travel of the object, Lo is the maximum length of objects to be weighed, Vo is the maximum velocity at which objects move over the platform, and Tcy is a cycle time between samples, and wherein M is at least as great as a predetermined number of samples used by the processor to calculate the weight of the object; and
    controlling spacing between objects in the series so that one object at a time is weighed.

5. The method of claim 1, wherein step (a) further comprises moving the object over the platform at a substantially uniform speed.

6. The method of claim 5, wherein the object is self-propelled.

7. The method of claim 5, wherein the object is not self-propelled, and the platform allows the object to move over and exit the platform by means of the object's momentum upon entering the platform.

8. The method of claim 7, wherein the platform supports the object with a series of rollers forming part of the platform, which rollers engage an underside of the object as it passes over the platform and rotate in a manner effective to minimize loss of momentum by the object.

9. The method of claim 1, wherein the calculating step further comprises:
    determining a zero value for the weight sensor;
    determining an average value of the succession of samples; and
    calculating the weight by subtracting the zero value from the average value.

10. An apparatus for measuring the weight of a moving object passing over a platform, comprising:
    at least one weight sensor for measuring the force applied to the platform;
    means for sampling the output of the sensor at predetermined intervals;
    means for storing a predetermined number of successive sample outputs;
    means for permitting the object to move smoothly over the platform;

an object detection sensor that generates a signal upon detecting the moving object on the platform;

means for calculating the weight of the object using a predetermined number of the successive sample outputs; and wherein the means for calculating the weight of an object is configured to determine the weight of the object based upon a single signal from the object detection sensor upon detecting an object on the platform using the predetermined number of successive sample outputs taken before the single signal is transmitted to the microprocessor.

11. The apparatus of claim 10, wherein the means for permitting the object to move smoothly over the platform comprises a set of rollers provided on the platform.

12. The apparatus of claim 10, wherein the means for permitting the object to move smoothly over the platform comprises wheels on the object.

13. The apparatus of claim 10, wherein the means for calculating the weight of the object includes an algorithm that takes the average of the stored values.

14. The apparatus of claim 10, wherein the detection sensor comprises an optical device that detects arrival of a leading edge of the object.

15. The apparatus of claim 10, further comprising means for continuously repeating steps of generating a weight sample that reflects the measured force value with the weight sensor, receiving samples from the weight sensor with the processor, and storing in the processor memory weight values based on the samples.

16. The apparatus of claim 15, wherein the processor has means for storing a succession of samples in memory on a first-in, first-out basis, so that the weight of the object is calculated based on a succession of samples measured immediately prior to the arrival of a leading edge of the object in a detection path of the detection sensor.

17. The apparatus of claim 14, further comprising means for measuring the weights of a series of moving objects which cross the platform one at a time; and means for controlling Ls, Lo, Vo and Tcy such that a number of samples M determined by the equation:

$$M=(Ls-Lo)/(Vo*Tcy)$$

wherein Ls is the length of the platform in the direction of travel of the object, Lo is the maximum length of objects to be weighed, Vo is the maximum velocity at which objects move over the platform, and Tcy is a period of time between samples, and wherein M is at least as great as a predetermined number of samples used by the processor to calculate the weight of each object.

* * * * *